United States Patent
Qiao et al.

(10) Patent No.: US 12,501,300 B2
(45) Date of Patent: Dec. 16, 2025

(54) METHOD FOR REPORTING CHANNEL STATE INFORMATION AND COMMUNICATION DEVICE

(71) Applicant: BEIJING XIAOMI MOBILE SOFTWARE CO., LTD., Beijing (CN)

(72) Inventors: Xuemei Qiao, Beijing (CN); Qin Mu, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 392 days.

(21) Appl. No.: 18/027,225

(22) PCT Filed: Sep. 22, 2020

(86) PCT No.: PCT/CN2020/116932
§ 371 (c)(1),
(2) Date: Mar. 20, 2023

(87) PCT Pub. No.: WO2022/061553
PCT Pub. Date: Mar. 31, 2022

(65) Prior Publication Data
US 2023/0337031 A1    Oct. 19, 2023

(51) Int. Cl.
*H04W 8/22* (2009.01)
*H04W 24/08* (2009.01)
(Continued)

(52) U.S. Cl.
CPC ............ *H04W 24/10* (2013.01); *H04W 8/22* (2013.01); *H04W 24/08* (2013.01);
(Continued)

(58) Field of Classification Search
CPC .. H04B 7/02–12; H04B 17/0082–3913; H04L 1/0001–1896;
(Continued)

(56) References Cited

U.S. PATENT DOCUMENTS

2014/0198677 A1* 7/2014 Xu .................... H04W 24/10
2020/0145864 A1   5/2020 Liu et al.
(Continued)

FOREIGN PATENT DOCUMENTS

CN    102624500 A    8/2012
CN    103929267 A    7/2014
(Continued)

OTHER PUBLICATIONS

PCT/CN2020/116932, English translation of Search Report dated May 28, 2021, 2 pages.
(Continued)

*Primary Examiner* — Timothy J Weidner
(74) *Attorney, Agent, or Firm* — Cozen O'Connor

(57) ABSTRACT

A method for reporting channel state information includes: determining a first configuration parameter, in which the first configuration parameter indicates a parameter for a first type of terminal to report CSI measurement information, and the first configuration parameter at least includes a CSI measurement information reporting threshold value; and reporting the CSI measurement information based on the CSI measurement information reporting threshold value.

20 Claims, 6 Drawing Sheets

(51) Int. Cl.
  *H04W 24/10* (2009.01)
  *H04W 72/1268* (2023.01)
  *H04W 72/23* (2023.01)
  *H04W 72/51* (2023.01)
  *H04W 84/02* (2009.01)
  *H04W 88/02* (2009.01)
  *H04W 88/08* (2009.01)
  *H04W 92/02* (2009.01)
  *H04W 92/10* (2009.01)

(52) U.S. Cl.
  CPC ....... *H04W 72/1268* (2013.01); *H04W 72/23* (2023.01); *H04W 72/51* (2023.01); *H04W 84/02* (2013.01); *H04W 88/02* (2013.01); *H04W 88/08* (2013.01); *H04W 92/02* (2013.01); *H04W 92/10* (2013.01)

(58) Field of Classification Search
  CPC ............ H04L 5/0001–0098; H04W 8/22–245; H04W 24/02–10; H04W 28/02–26; H04W 36/0005–385; H04W 72/02–569; H04W 84/02–16; H04W 88/02–12; H04W 92/02–04; H04W 92/10
  See application file for complete search history.

(56) References Cited

U.S. PATENT DOCUMENTS

2022/0078809 A1\* 3/2022 Zhou .................... H04W 24/10
2023/0126986 A1\* 4/2023 Hao ...................... H04W 24/10

FOREIGN PATENT DOCUMENTS

| CN | 110383875 A | 10/2019 |
| EP | 3461201 A1 | 3/2019 |
| WO | WO 2014113243 A2 | 7/2014 |

OTHER PUBLICATIONS

Chinese Patent Application No. 202080002416.0, Office Action dated Sep. 20, 2023, 4 pages.

Chinese Patent Application No. 202080002416.0, English translation of Office Action dated Sep. 20, 2023, 8 pages.

Qualcomm Inc. "Power consumption reduction" 3GPP TSG RAN WG1 #82, R1-153853, Aug. 2015, 5 pages.

European Patent Application No. 20954407.1, partial Search and Opinion dated May 14, 2024, 16 pages.

\* cited by examiner

METHOD FOR REPORTING CHANNEL STATE INFORMATION AND COMMUNICATION DEVICE

CROSS REFERENCE TO RELATED APPLICATIONS

This application is a national phase application based on International Application No. PCT/CN2020/116932, filed Sep. 22, 2020, the entire content of which is incorporated by reference for all purposes.

TECHNICAL FIELD

The present disclosure relates to a field of wireless communication technologies, and particularly to a method for reporting channel state information (CSI), and a storage medium.

BACKGROUND

In a wireless communication system, a channel environment for transmitting data is affected by many factors. To detect a current channel environment, the wireless communication system may acquire a channel quality status of a physical downlink channel in real time by means of a CSI reference signal.

In related art, a terminal reports CSI measurement information to a network side device, including periodic reporting, semi-persistent reporting and non-periodic reporting. However, when the terminal is in a fixed or static state, a channel state of the terminal has little or no change. In this case, the terminal still needs to report the CSI measurement information to the network side device, which may cause an unnecessary overhead on resources and energy consumption for reporting CSI.

SUMMARY

According to a first aspect of embodiments of the present disclosure, there is provided a method for reporting channel state information (CSI), performed by a terminal. The method includes:
determining a first configuration parameter, in which the first configuration parameter indicates a parameter for a first type of terminal to report CSI measurement information, and the first configuration parameter at least includes a CSI measurement information reporting threshold value; reporting the CSI measurement information based on the CSI measurement information reporting threshold value.

According to a second aspect of embodiments of the present disclosure, there is provided a method for reporting channel state information (CSI), performed by a network-side device. The method includes:
determining a first configuration parameter, in which the first configuration parameter indicates a parameter for a first type of terminal to report CSI measurement information, and the first configuration parameter at least includes a CSI measurement information reporting threshold value.

According to a third aspect of embodiments of the present disclosure, there is provided a communication device. The communication device includes:
a processor; and
a memory configured to store instructions executable by the processor;
in which, the processor is configured to perform:
determining a first configuration parameter, in which the first configuration parameter indicates a parameter for a first type of terminal to report CSI measurement information, and the first configuration parameter at least includes a CSI measurement information reporting threshold value; and reporting the CSI measurement information based on the CSI measurement information reporting threshold value.

It should be noted that, the details above and in the following are exemplary and illustrative, and do not constitute the limitation on the present disclosure.

BRIEF DESCRIPTION OF THE DRAWINGS

The drawings herein are incorporated into the specification and constitute a part of the specification, show embodiments in conformity with embodiments of the present disclosure, and explain the principle of the present disclosure together with the specification.

DETAILED DESCRIPTION

Figure 1:
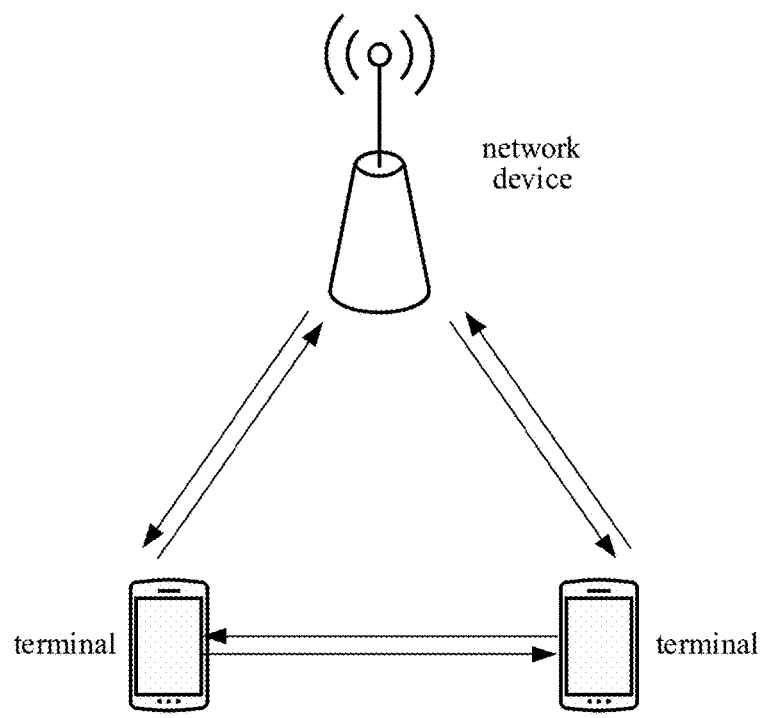
FIG. 1 is a schematic diagram illustrating an architecture of a communication system between a network device and a terminal according to an exemplary embodiment.

The exemplary embodiments will be described in detail here, and examples thereof are shown in the accompanying drawings. When the following descriptions refer to the accompanying drawings, same numbers in different drawings represent same or similar elements unless otherwise indicated. The implementations described in the following exemplary embodiments do not represent all implementations consistent with the present disclosure. Rather, they are merely examples of apparatuses and methods consistent with some aspects of the disclosure as detailed in the appended claims.

In a wireless communication system, a terminal and a network side device may communicate through a transmission channel. However, the transmission channel is easily affected by many factors, resulting in that the transmission channel in the communication system presents with features of dynamic changes. In related art, a channel quality status of a physical downlink control channel (PDCCH) may be acquired in real time by means of a channel state information-reference signal (CSI-RS). The implementation includes that: the network side device sends the CSI-RS signal to the terminal through configuration information. The terminal measures a received CSI-RS signal, and reports a CSI measurement result to the network side device. The network side device determines the channel quality status of the PDCCH based on the CSI measurement result reported by the terminal, and performs related scheduling processing.

The related wireless communication system includes three ways to report CSI measurement information by a terminal.

In one way, the terminal periodically reports the CSI measurement information. Specifically, the network side device configures time-frequency domain resources for periodically reporting the CSI measurement information for the terminal by means of a radio resource control (RRC) signaling. The terminal performs periodic measurement on CSI, and periodically reports the CSI measurement information based on a measurement period for the CSI. This way carries the CSI measurement information by means of a physical uplink control channel (PUCCH).

In another way, the terminal reports the CSI measurement information by means of semi-persistent reporting. In this way, a resource for reporting the CSI measurement information may be a PUCCH resource or a physical uplink shared channel (PUSCH) resource. Reporting, by the terminal, the CSI measurement information based on the PUSCH resource may include that: the terminal acquires a resource for reporting the CSI measurement information based on a dynamic signaling of the network side device, and when semi-persistently reporting the CSI measurement information based on the PUSCH resource, the terminal may be activated or deactivated to report the CSI measurement information by using the PUSCH resource by means of downlink control information (DCI) scrambled by a scheduling request (SR) CSI radio network temporary identity (RNTI) (SR-CSI-RNTI). Reporting, by the terminal, the CSI measurement information based on a PUCCH resource may include that the network side device may configure a semi-static reporting resource for the terminal by means of a RRC signaling, and when semi-persistently reporting the CSI measurement information by using the PUCCH resource, the terminal is activated or deactivated to semi-persistently report the CSI measurement information by using the PUCCH resource by means of a media access control, control element (MAC-CE) on the PUCCH resource. For example, in response to a slot when the terminal receives a Hybrid Automatic Repeat reQuest (HARD) Acknowledgement (ACK) corresponding to a physical downlink shared channel (PDSCH) being n, reporting CSI by the terminal comes into effect at a $(n+3N_{slot}^{subframe,\,u}+1)$ slot.

In yet another way, the terminal non-periodically reports the CSI measurement information. In this way, the terminal is triggered to report the CSI measurement information by means of DCI scrambled C-RNTI and reports based on the PUSCH resource. In this case, reporting the CSI measurement information by the terminal is indicated by the network side device by means of a CSI Request field in a DCI format 0_1.

A reduced capability user equipment (Redcap UE) includes three use cases, for example, a factory sensor, a video surveillance equipment and a wearable device. Positions where the factory sensor and the video surveillance equipment are deployed are relatively fixed, therefore, changes in channel states of terminals deployed in the factory sensor and the video surveillance equipment are relatively small. However, a wireless system that still adopts the above three methods to report the CSI measurement information may easily result in an unnecessary overhead on energy consumption and/or resources for reporting CSI.

For the problems involved in the above ways, a method for reporting channel state information (CSI) is provided in the present disclosure. FIG. 1 is a schematic diagram illustrating an architecture of a communication system between a network device and a terminal according to an exemplary embodiment. The method for reporting channel state information (CSI) provided in the present disclosure may be applicable to an architecture of a communication system illustrated in FIG. 1. As illustrated in FIG. 1, a terminal acquires CSI measurement information by performing CSI measurement on a channel state based on a CSI-RS signal sent by a network side device. The terminal compares the CSI measurement information with a previous CSI measurement. When a channel state measured currently is quite different from a channel state measured previously, the terminal may report current CSI measurement information to the network side device. Otherwise, the terminal may not report any CSI measurement information. Overhead on energy consumption and/or resources used by reporting the CSI measurement information are further saved.

It may be understood that, the communication system between the network device and the terminal as illustrated in FIG. 1 are only illustrative, and the wireless communication system may further include other network devices, for example, a core network device, a wireless relay device and a wireless backhaul device, etc., not shown in FIG. 1. A number of network devices and a number of terminals included in the wireless communication system are not limited in embodiments of the present disclosure.

It may be further understood that, the wireless communication system in embodiments of the present disclosure is a network that provides a wireless communication function. The wireless communication system may adopt different communication technologies, for example, code division multiple access (CDMA), wideband code division multiple access (WCDMA), time division multiple access (TDMA), frequency division multiple access (FDMA), orthogonal frequency-division multiple access (OFDMA), single Carrier FDMA (SC-FDMA) and carrier sense multiple access with collision avoidance. The networks may be classified, based on capacities, rates, time-delays and other factors of different networks, into a 2G (generation) network, a 3G network, a 4G network or a future evolution network, such as a 5G network, also referred to as a new radio (NR) network. For ease of description, the wireless communication network is simply referred to as a network in the disclosure sometimes.

Further, the network device involved in the present disclosure may also be referred to as a wireless access network device. The wireless access network device may be an access point (AP), a wireless relay node, a wireless backhaul node, a transmission point (TP), or a transmission and reception point (TRP), etc., in a base station, an evolved node B (a base station), a home base station and a wireless fidelity (WiFi) system, or a gNB in an NR system, or may also be components or part of devices for constituting the base station. The network device further may be a vehicle-mounted device in case of an Internet of Vehicles (V2X) communication system. It should be understood that, a specific technology and a specific device form adopted by the network device are not limited in embodiments of the present disclosure.

Further, the terminal involved in the present disclosure, also referred to as a terminal device, a user equipment (UE), a mobile station (MS), a mobile terminal (MT), etc., may be a device that provides voice and/or data connectivity to a user. For example, the terminal may be a handheld device, or a vehicle-mounted device, etc., with a wireless connection function. At present, some terminals may include, for example, a mobile phone, a pocket personal computer (PPC), a palm computer, a personal digital assistant (PDA), a notebook computer, a tablet computer, a wearable device, or a vehicle-mounted device. In addition, the terminal device further may be a vehicle-mounted device in case of the Internet of Vehicles (V2X) communication system. It should be understood that, a specific technology and a specific device form adopted by the terminal are not limited in embodiments of the present disclosure.

A method for reporting channel state information (CSI) is provided in embodiments of the present disclosure. The method for reporting channel state information (CSI) is illustrated in combination with attached drawings in embodiments of the present disclosure.

Figure 2:
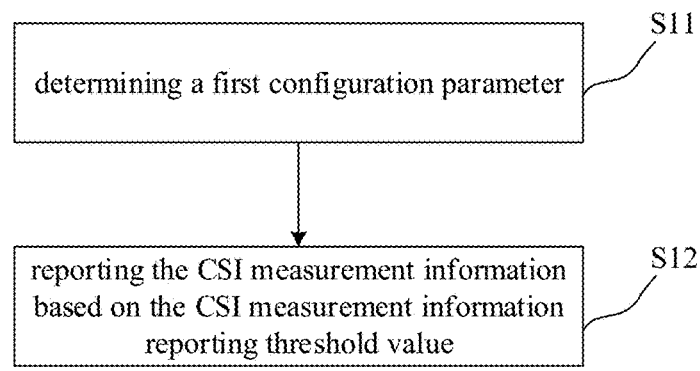
FIG. 2 is a flowchart illustrating a method for reporting channel state information (CSI) according to an exemplary embodiment.

FIG. 2 is a flowchart illustrating a method for reporting channel state information (CSI) according to an exemplary embodiment. As illustrated in FIG. 2, the method for reporting channel state information (CSI) is performed by a terminal, and includes the following steps.

At step S11, a first configuration parameter is determined.

In an embodiment of the present disclosure, the first configuration parameter is used to indicate a parameter for a first type of terminal to report CSI measurement information, and the first configuration parameter may include a CSI measurement information reporting threshold value. In another embodiment, in addition to the CSI measurement information reporting threshold value, the first configuration parameter may further include any one of:
  a number of measurement reporting;
  a measured object; or
  a way for acquiring a reporting resource for reporting the CSI measurement information.

For example, the first type of terminal may be a redcap UE or a stationary redcap UE. The terminal is only illustrative, and not limited in the present disclosure.

In some embodiments, the first configuration parameter at least includes the CSI measurement information reporting threshold value.

In other embodiments, the first configuration parameter may further include the number of measurement reporting. In other words, a number of measurement items to be reported by the terminal is configured.

In yet other embodiments, the first configuration parameter may further include the measured object (for example, a physical resource for downlink measurement).

In some embodiments, the first configuration parameter may further include the way for acquiring the reporting resource for reporting the CSI measurement information by the terminal. It may be understood that the network side device may configure for the terminal one or more different ways for acquiring reporting resources.

The network side device configures the first configuration parameter for the terminal to report the CSI information by means of a high-layer RRC signaling. The network side device, based on characteristics of the first type of terminal, configures the first configuration parameter for the terminal by using a relatively fixed periodic configuration mode by means of the RRC signaling.

At step S12, the CSI measurement information is reported based on the CSI measurement information reporting threshold value. In embodiments of the present disclosure, the terminal determines whether to report current CSI measurement information based on the CSI measurement information reporting threshold value configured by the network side device. In embodiments of the present disclosure, the CSI measurement information may be a signal to interference plus noise ratio (SINR). The following is illustrated by taking current CSI measurement information of a channel state being a first CSI measurement value M(n), previous CSI measurement information of the channel state being a second CSI measurement value M(n−1), and the CSI measurement information reporting threshold value being M_delta for an example. In the present disclosure, the method for reporting the CSI measurement information may effectively reduce a resource overhead for reporting the CSI measurement information.

In an implementation of the present disclosure, the terminal reports the CSI measurement information in response to a difference value between the first CSI measurement value and the second CSI measurement value being greater than the CSI measurement information reporting threshold value. In some embodiments, the CSI measurement information reporting threshold value may be compared with an absolute value of the difference value between the first CSI measurement value and the second CSI measurement value, that is, in case of |M(n)−M(n−1)|>M_delta, the terminal reports the CSI measurement information. Alternatively, the terminal reports the CSI measurement information in response to the difference value between the first CSI measurement value and the second CSI measurement value being equal to the CSI measurement information reporting threshold value. In some embodiments, the CSI measurement information reporting threshold value may be compared with the absolute value of the difference value between the first CSI measurement value and the second CSI measurement value, that is, in case of |M(n)−M(n−1)|=M_delta, the terminal reports the CSI measurement information.

In embodiments of the present disclosure, the CSI measurement information reporting threshold value may be compared with the difference value between the first CSI measurement value and the second CSI measurement value or the absolute value of the difference value between the first CSI measurement value and the second CSI measurement value, which will not be repeated in any one embodiment of the present disclosure.

In an implementation, the terminal does not report the CSI measurement information in response to the difference value between the first CSI measurement value and the second CSI measurement value being less than the CSI measurement information reporting threshold value. In some embodiments, the CSI measurement information reporting threshold value may be compared with the absolute value of the difference value between the first CSI measurement value and the second CSI measurement value, that is, in case of |M(n)−M(n−1)|<M_delta, the terminal does not report the CSI measurement information. Alternatively, the terminal does not report the CSI measurement information in response to the difference value between the first CSI measurement value and the second CSI measurement value being equal to the CSI measurement information reporting threshold value. In some embodiments, the CSI measurement information reporting threshold value may be the absolute value of the difference value between the first CSI measurement value and the second CSI measurement value, that is, in case of |M(n)−M(n−1)|=M_delta, the terminal does not report the CSI measurement information.

In embodiments of the present disclosure, the network side device may configure at least one CSI measurement information reporting threshold value for the terminal. The CSI measurement information reporting threshold value may be configured based on a type of a terminal or different service types included in the terminal. For example, in a case that a certain type of terminal has sensitive requirements on a channel quality statue, for example, a stationary safe-type sensor, a small CSI measurement information reporting threshold is configured for such type of sensor. In a case that the terminal is a common video monitoring device, a large CSI measurement information reporting threshold is configured for the terminal. That is, different service types may correspond to different CSI measurement information reporting threshold values; or different terminal types may correspond to different CSI measurement information reporting threshold values; or different services in the same terminal have different requirements on the channel quality statue, and more than one CSI measurement information reporting threshold values are configured for the terminal based on different service requirements.

In embodiments of the present disclosure, when the terminal triggers CSI measurement information reporting, the CSI measurement information may be reported through different resources. In some embodiments, the terminal may actively perform the CSI measurement information reporting. In some embodiments, the terminal may perform the CSI measurement information reporting based on a relevant communication protocol. In some embodiments, the terminal may perform CSI measurement information reporting based on a preset trigger time.

An embodiment of the present disclosure provides the method for reporting the CSI. The embodiment may be separately implemented or in combination with any other embodiment. The method for reporting the CSI in an embodiment of the present disclosure may include reporting the CSI measurement information through a PUCCH resource by the terminal.

One implementation is for a situation that the terminal periodically measures the CSI based on a first period. The network side device configures for the terminal the PUCCH resource for periodically reporting the CSI measurement information. The terminal periodically reports the CSI measurement information on the PUCCH resource based on a second period. The second period has a same initial time-domain position and a same slot length as the first period. A time-domain position of the PUCCH resource in the second period is offset from a time-domain position of the PUCCH resource in the first period by N slots. The time-domain position of the PUCCH resource in the second period is used as a time-domain position of a resource for transmitting current CSI measurement information. In an embodiment of the present disclosure, N offset slots may be determined based on comparing factors such as a time of the CSI measurement information, an uplink symbol start time and a slot alignment time. Additionally, the first period and the second period may be appropriately expanded based on a stable channel quality statue of the terminal. For example, the first period and the second period are increased to 1280 slots, etc. The energy consumption of the terminal may be effectively reduced. In an embodiment of the present disclosure, when the terminal periodically reports the CSI measurement information on the PUCCH resource based on the second period, the terminal may report the CSI measurement information by using PUCCH format 2 resource. Reporting the CSI measurement information by using the PUCCH format 2 resource is applicable to CSI measurement information with a small payload, which may avoid waste of the PUCCH resource.

Another implementation is for a situation that the terminal non-periodically measures the CSI. The network side device statically configures for the terminal PUCCH time-frequency domain resources for reporting the CSI by means of the RRC signaling. The terminal reports the CSI measurement information based on a first PUCCH resource. A time-domain position of the first PUCCH resource is offset from a time-domain position of a resource for measuring the CSI by N slots. The time-domain position of the first PUCCH resource is as a time-domain position of a resource for transmitting current CSI measurement information. This implementation is similar to the above implementation. In order to avoid waste of the PUCCH resource, the CSI measurement information is reported by using the PUCCH format 2 resource. Reporting the CSI measurement information by using the PUCCH format 2 resource is applicable to the CSI measurement information with the small payload.

Figure 3:
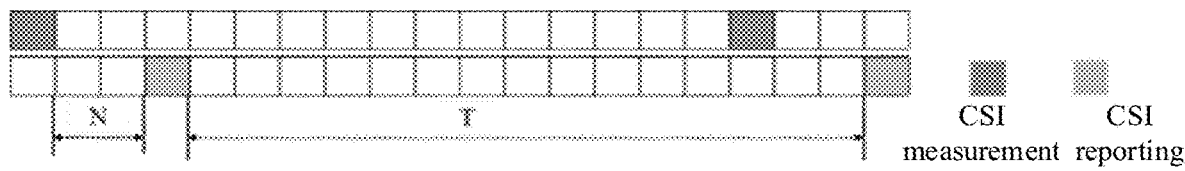
FIG. 3 is a schematic diagram illustrating an offset slot of time domain positions of resources for reporting CSI measurement information and measuring CSI in a method for reporting channel state information (CSI) according to an exemplary embodiment.

For example, FIG. 3 is a schematic diagram illustrating an offset slot of time-domain positions of resources for reporting CSI measurement information and measuring CSI in a method for reporting channel state information (CSI) according to an exemplary embodiment. As illustrated in FIG. 3, when a value of N is 2, the time-domain position of the resource for reporting the CSI measurement information is offset from the time-domain position of the resource for measuring the CSI by 2 slots.

The terminal reports the CSI measurement information based on the second period, which may render the terminal capable of reporting the CSI measurement information timely, without reporting the CSI measurement information when the channel quality status changes little. Therefore, overload of RF energy consumption for the CSI reporting may be effectively reduced.

In an embodiment of the present disclosure, resource positions of the N slots offset may be determined based on preconfiguration information. In some embodiments, N may be set as a fixed value by means of a signaling or a communication protocol configured by the network side device. In another embodiment, an offset value N may be dynamically determined based on the signaling configured by the network side device. The terminal determines the value of N based on the preconfiguration information, and reports the CSI measurement information at a position which is offset from the time-domain position of the resource for measuring the CSI by the N slots. In another implementation, the value of N may be determined by means of the RRC signaling. In this case, the value of N may be variable. The network side device may report the CSI measurement information by selecting one candidate offset slot from a set of offset slots as a slot offset from the time-domain position of the resource for measuring the CSI by the N slots based on a processing capacity of the terminal. The value of N is configured to the terminal by means of the RRC signaling. As described above, the CSI measurement and reporting the CSI measurement information are performed based on different time-domain resources of the PUCCH resource, without a complicated scheduling process.

Reporting the CSI measurement information based on the PUCCH resource further includes an implementation that the terminal may request to acquire a PUCCH resource for reporting the CSI measurement information based on a first uplink scheduling request (SR) SR1. In some embodiments, the SR1 is dedicated for requesting to acquire a resource for reporting the CSI measurement information.

The network side device allocates for the terminal the PUCCH resource required for reporting the CSI measurement information when receiving a dedicated SR1 signaling sent by the terminal. Based on the above embodiment, the first configuration parameter for the terminal to report the CSI measurement information is determined by the network side device, therefore, the network side device may determine a size of a payload of the CSI measurement information reported by the terminal. When determining that the payload of the CSI measurement information currently reported by the terminal is small, the network side device may indicate the terminal to report the CSI measurement information by means of PUCCH format 2. When determining that the payload of the CSI measurement information reported by the terminal is large, the network side device may indicate the terminal to report the CSI measurement information by means of a new PUCCH format, and allocate more time-frequency resources for the new PUCCH format. The network side device indicates a position and a format of the PUCCH resource used by the terminal by means of DCI.

An embodiment of the present disclosure provides the method for reporting the CSI. The embodiment may be separately implemented or in combination with any other embodiment. The method for reporting the CSI in an embodiment of the present disclosure includes reporting, by the terminal, the CSI measurement information based on a PUSCH resource.

In an implementation, for a situation that an available PUSCH resource is presented currently in the terminal, the terminal determines to report the CSI measurement information by using the current available PUSCH resource, in response to determining that the available PUSCH resource is presented currently. For convenience of description, the available PUSCH resource presented currently is referred to as a first PUSCH resource. The first PUSCH resource is used for transmitting other uplink data simultaneously. In embodiments of the present disclosure, in order to distinguish the CSI measurement information and other uplink data, the CSI measurement information is carried by a MAC-CE of the first PUSCH resource. The MAC-CE uses a reserved value 35 of a logical channel identify (LCID) of an uplink shared channel (UL-SCH). In embodiments of the present disclosure, the MAC CE for CSI measurement information reporting uses a variable byte, and the size of bytes of the MAC-CE for CSI measurement information reporting is determined based on the number of measurement items included in the CSI measurement information reported.

Figure 4:
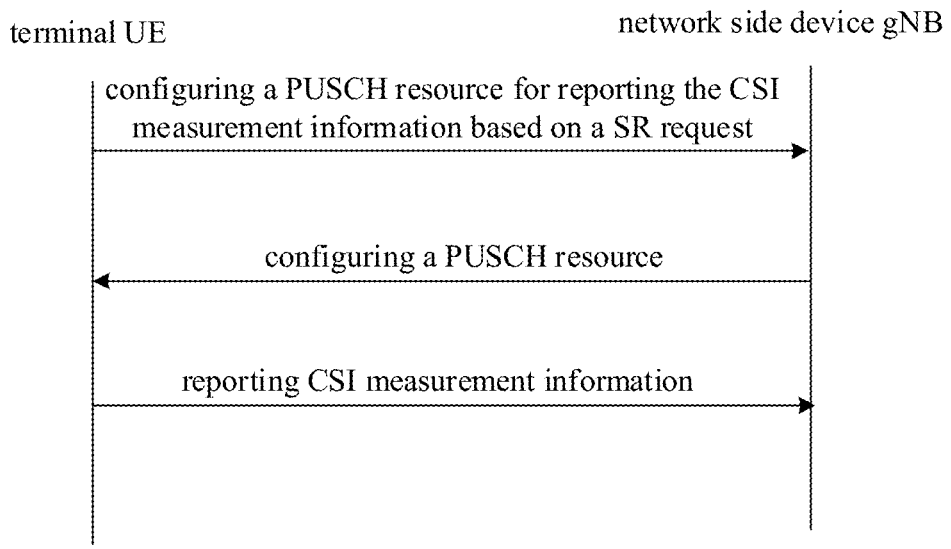
FIG. 4 is a schematic diagram illustrating reporting CSI measurement information by multiplexing a PUSCH resource carrying a buffer status report (BSR) in a method for reporting channel state information (CSI) according to an exemplary embodiment.

In another implementation, the terminal may report the CSI measurement information by multiplexing a PUSCH resource carrying a buffer status report (BSR). For example, the implementation is applicable to a situation that no available PUSCH resource and no other uplink data transmission are presented currently. For convenience of description, the PUSCH resource carrying the BSR is referred to as a second PUSCH resource. In the present disclosure, the CSI measurement information for reporting uses the reserved value 35 of the LCID of the UL-SCH. For example, FIG. 4 is a schematic diagram illustrating reporting CSI measurement information by multiplexing a PUSCH resource carrying a buffer status report (BSR) in a method for reporting channel state information (CSI) according to an exemplary embodiment. As illustrated in FIG. 4, the terminal requests to configure the PUSCH resource for reporting the CSI measurement information to the network side device based on a general scheduling request (SR). The network side device configures the PUSCH resource after receiving request information sent by the terminal, and the terminal reports the CSI measurement information based on the PUSCH resource configured by the network side device. It may be understood that, since the PUSCH resource for transmitting the BSR that is allocated for the terminal by the network side device is small, the implementation is applicable to a situation that a payload for carrying the CSI measurement information is small.

Figure 5:
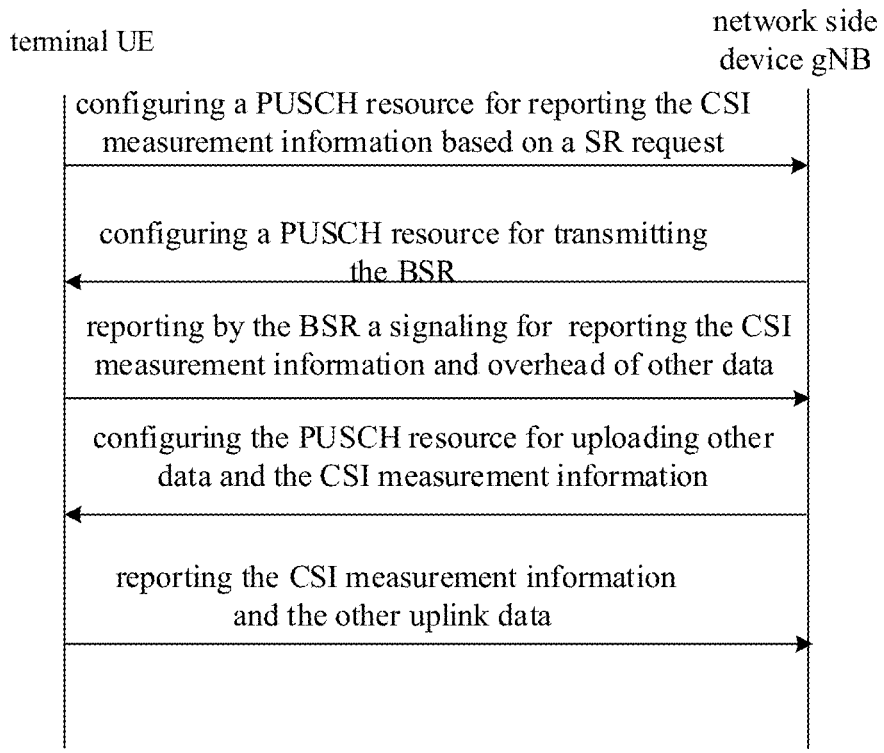
FIG. 5 is a schematic diagram illustrating reporting CSI measurement information by using a resource for transmitting other uplink data in a method for reporting channel state information (CSI) according to an exemplary embodiment.

In another implementation, the CSI measurement information is reported on the first PUSCH resource for transmitting other uplink data transmission. The CSI measurement information is uploaded to the network side device; or the CSI measurement information and the other uplink transmission data together are uploaded to the network side device. For example, the implementation is applicable to a situation that no available PUSCH resource is presented currently and other uplink data transmission is presented currently. FIG. 5 is a schematic diagram illustrating reporting CSI measurement information by using a resource for transmitting other uplink data in a method for reporting channel state information (CSI) according to an exemplary embodiment. As illustrated in FIG. 5, the terminal requests to use a PUSCH resource for reporting the CSI measurement information based on the general scheduling request (SR). Taking other uplink data being a BSR for an example, the network side device configures for the terminal a PUSCH resource for transmitting the BSR based on the SR sent by the terminal. The BSR transmitted by the terminal reports a signaling for reporting the CSI measurement information as well as overhead of other data to the network side device. The network side device configures for the terminal the PUSCH resource for uploading other data and the CSI measurement information based on the signaling of the CSI measurement information and the overhead of the other data. The terminal reports the CSI measurement information and the other uplink data based on the PUSCH resource. In an embodiment of the present disclosure, the reported CSI measurement information is carried by the MAC-CE of the PUSCH resource, and uses the reserved value 35 of the LCID of the UL-SCH. The implementation is further applicable to a situation that the payload for CSI measurement information is large and no other uplink data is to be transmitted.

In an embodiment of the present disclosure, reporting the CSI measurement information based on the PUSCH resource further includes an implementation that the terminal may send a second uplink scheduling request (SR) SR2. The SR2 is dedicated for requesting to acquire a third PUSCH resource for reporting the CSI measurement information, and the third PUSCH resource is dedicated for transmitting the CSI measurement information. In the implementation, the terminal sends the SR2 request to request the third PUSCH resource for reporting the CSI measurement information, and the network side allocates for the terminal the third PUSCH resource for reporting the CSI measurement information based on the scheduling request SR2 dedicated for the terminal. A size of the third PUSCH resource is determined based on the first configuration parameter configured by the network side device for the terminal.

In embodiments of the present disclosure, various implementations for reporting the CSI measurement information configured increases flexibility of reporting the CSI measurement information. And, the dedicated SR1 and SR2 involved in the disclosure are redesigned, and the general SR may be differentiated with the dedicated SR1 and SR2 based on different time-frequency domain resource positions/sequences. It may be understood that the redesigned dedicated SR1 and SR2 may not affect other uplink scheduling request.

An embodiment of the present disclosure provides the method for reporting the CSI. The embodiment may be separately implemented or in combination with any other embodiment. The method for reporting the CSI in an embodiment of the present disclosure includes that the terminal reports the CSI measurement information by combining the PUCCH resource with the PUSCH resource.

In some embodiments, when the available PUCCH resource is presented, the CSI measurement information is reported by means of the PUCCH resource. When no available PUCCH resource is presented, the CSI measurement information is reported by means of the PUSCH resource. However, how to report by means of the PUCCH resource may refer to any one way in embodiments of the present disclosure, and adopt any one feasible way in the related art. Similarly, how to report by means of the PUSCH resource may refer to any one way in embodiments of the present disclosure, and adopt any one feasible way in the related art.

In some embodiments, when the available PUCCH resource is presented, the CSI measurement information may be reported by means of the PUCCH resource. when no available PUCCH resource is presented, the CSI measurement information may be reported by means of the PUSCH resource. However, how to report by means of the PUCCH resource may refer to any one way in embodiments of the present disclosure, and adopt any one feasible way in the related art. Similarly, how to report by means of the PUSCH resource may refer to any one way in embodiments of the present disclosure, and adopt any one feasible way in the related art.

Based on the same or similar concept, a method for reporting channel state information (CSI) is further provided in embodiments of the present disclosure.

Figure 6:
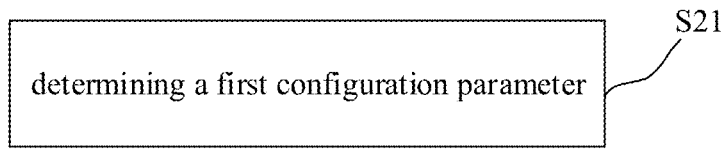
FIG. 6 is a flowchart illustrating another method for reporting channel state information (CSI) according to an exemplary embodiment.

FIG. 6 is a flowchart illustrating a method for reporting channel state information (CSI) according to an exemplary embodiment. As illustrated in FIG. 6, the method for reporting channel state information (CSI) is performed by a terminal, and includes the following steps.

At step S21, a first configuration parameter is determined.

In an embodiment of the present disclosure, the first configuration parameter is used to indicate a parameter for a first type of terminal to report CSI measurement information, and the first configuration parameter may include a CSI measurement information reporting threshold value. In another embodiment, in addition to the CSI measurement information reporting threshold value, the first configuration parameter may further include any one of:
  a number of measurement reporting;
  a measured object; or
  a way for acquiring a reporting resource for reporting the CSI measurement information.

For example, the first type of terminal may be a redcap UE or a stationary redcap UE. The terminal is only illustrative, and not limited in the present disclosure.

In some embodiments, the first configuration parameter at least includes the CSI measurement information reporting threshold value.

In other embodiments, the first configuration parameter may further include the number of measurement reporting. In other words, a number of measurement items to be reported by the terminal is configured.

In yet other embodiments, the first configuration parameter may further include the measured object (for example, a physical resource for downlink measurement).

In some embodiments, the first configuration parameter may further include the way for acquiring the reporting resource for reporting the CSI measurement information by the terminal. It may be understood that the network side device may configure for the terminal one or more different ways for acquiring reporting resources.

The network side device configures the first configuration parameter for the terminal to report the CSI information by means of a high-layer RRC signaling. The network side device, based on characteristics of the first type of terminal, configures the first configuration parameter for the terminal by using a relatively fixed periodic configuration mode by means of the RRC signaling.

In an embodiment of the present disclosure, the network side device may receive CSI measurement information reported by the terminal. The CSI measurement information is CSI measurement information reported by the first type of terminal in response to a difference value between a first CSI measurement value and a second CSI measurement value of the channel state being greater than the CSI measurement information reporting threshold value. Alternatively, the CSI measurement information is CSI measurement information reported by the first type of terminal in response to the difference value between the first CSI measurement value and the second CSI measurement value of the channel state being equal to the CSI measurement information reporting threshold value.

In embodiments of the present disclosure, the terminal determines whether to report current CSI measurement information based on the CSI measurement information reporting threshold value configured by the network side device. In embodiments of the present disclosure, the CSI measurement information may be a signal to interference plus noise ratio (SINR). The following is illustrated by taking current CSI measurement information of a channel state being a first CSI measurement value $M(n)$, previous CSI measurement information of the channel state being a second CSI measurement value $M(n-1)$, and the CSI measurement information reporting threshold value being M_delta for an example. In the present disclosure, the method for reporting the CSI measurement information may effectively reduce a resource overhead for reporting the CSI measurement information.

In an implementation of the present disclosure, the terminal reports the CSI measurement information in response to a difference value between the first CSI measurement value and the second CSI measurement value being greater than the CSI measurement information reporting threshold value. In some embodiments, the CSI measurement information reporting threshold value may be compared with an absolute value of the difference value between the first CSI measurement value and the second CSI measurement value, that is, in case of |M(n)−M(n−1)|>M_delta, the terminal reports the CSI measurement information. Alternatively, the terminal reports the CSI measurement information in response to the difference value between the first CSI measurement value and the second CSI measurement value being equal to the CSI measurement information reporting threshold value. In some embodiments, the CSI measurement information reporting threshold value may be compared with the absolute value of the difference value between the first CSI measurement value and the second CSI measurement value, that is, in case of |M(n)−M(n−1)|=M_delta, the terminal reports the CSI measurement information.

In embodiments of the present disclosure, the CSI measurement information reporting threshold value may be compared with the difference value between the first CSI measurement value and the second CSI measurement value or the absolute value of the difference value between the first CSI measurement value and the second CSI measurement value, which will not be repeated in any one embodiment of the present disclosure.

In an implementation, the terminal does not report the CSI measurement information in response to the difference value between the first CSI measurement value and the second CSI measurement value being less than the CSI measurement information reporting threshold value. In some embodiments, the CSI measurement information reporting threshold value may be compared with the absolute value of the difference value between the first CSI measurement value and the second CSI measurement value, that is, in case of |M(n)−M(n−1)|<M_delta, the terminal does not report the CSI measurement information. Alternatively, the terminal reports the CSI measurement information in response to the difference value between the first CSI measurement value and the second CSI measurement value being equal to the CSI measurement information reporting threshold value. In some embodiments, the CSI measurement information reporting threshold value may be compared with the absolute value of the difference value between the first CSI measurement value and the second CSI measurement value, that is, in case of |M(n)−M(n−1)|=M_delta, the terminal does not report the CSI measurement information.

In embodiments of the present disclosure, the network side device may configure at least one CSI measurement information reporting threshold value for the terminal. The CSI measurement information reporting threshold value may be configured based on a type of a terminal or different service types included in the terminal. For example, in a case that a certain type of terminal has sensitive requirements on a channel quality statue, for example, a stationary safe-type sensor, a small CSI measurement information reporting threshold is configured for such type of sensor. In a case that the terminal is a common video monitoring device, a large CSI measurement information reporting threshold is configured for the terminal. That is, different service types may correspond to different CSI measurement information reporting threshold values; or different terminal types may correspond to different CSI measurement information reporting threshold values; or different services in the same terminal have different requirements on the channel quality statue, and more than one CSI measurement information reporting threshold values are configured for the terminal based on different service requirements.

In embodiments of the present disclosure, when the terminal triggers CSI measurement information reporting, the CSI measurement information may be reported through different resources. In some embodiments, the terminal may actively perform the CSI measurement information reporting. In some embodiments, the terminal may perform the CSI measurement information reporting based on a relevant communication protocol. In some embodiments, the terminal may perform CSI measurement information reporting based on a preset trigger time.

An embodiment of the present disclosure provides the method for reporting the CSI. The embodiment may be separately implemented or in combination with any other embodiment. The method for reporting the CSI in an embodiment of the present disclosure may include that the network side device receives the CSI measurement information based on a PUCCH resource.

One implementation is for a situation that the terminal performs periodically measures the CSI based on a first period. The network side device configures for the terminal the PUCCH resource for periodically reporting the CSI measurement information. The terminal periodically reports the CSI measurement information on the PUCCH resource based on a second period. The second period has a same initial time-domain position and a same slot length as the first period. A time-domain position of the PUCCH resource in the second period is offset from a time-domain position of the PUCCH resource in the first period by N slots. The time-domain position of the PUCCH resource in the second period is used as a time-domain position of a resource for transmitting current CSI measurement information. In an embodiment of the present disclosure, N offset slots may be determined based on comparing factors such as a time of the CSI measurement information, an uplink symbol start time and a slot alignment time. Additionally, the first period and the second period may be appropriately expanded based on a stable channel quality statue of the terminal. For example, the first period and the second period are increased to 1280 slots, etc. The energy consumption of the terminal may be effectively reduced. In an embodiment of the present disclosure, when the terminal periodically reports the CSI measurement information on the PUCCH resource based on the second period, the terminal may report the CSI measurement information by using PUCCH format 2 resource. The network side device receives the CSI measurement information on the PUCCH format 2 resource, which is applicable to CSI measurement information with a small payload, thus avoiding waste of the PUCCH resource.

Another implementation is for a situation that the terminal non-periodically measures the CSI. The network side device statically configures for the terminal PUCCH time-frequency domain resources for reporting the CSI by means of the RRC signaling. The terminal reports the CSI measurement information based on a first PUCCH resource. A time-domain position of the first PUCCH resource is offset from a time-domain position of a resource for measuring the CSI by N slots. The time-domain position of the first PUCCH resource is as a time-domain position of a resource for transmitting current CSI measurement information. This implementation is similar to the above implementation. In order to avoid waste of the PUCCH resource, the CSI measurement information is reported by using the PUCCH format 2 resource. The network side device receives the CSI measurement information based on the PUCCH format 2 resource, which is applicable to the CSI measurement information with the small payload.

Figure 7:
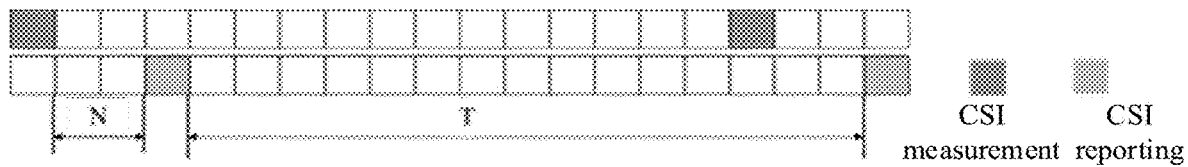
FIG. 7 is a schematic diagram illustrating an offset slot of time domain positions of resources for receiving CSI measurement information and measuring CSI in a method for reporting channel state information (CSI) according to an exemplary embodiment.

For example, FIG. 7 is a schematic diagram illustrating an offset slot of time-domain positions of resources for receiving CSI measurement information and measuring CSI in a method for reporting channel state information (CSI) according to an exemplary embodiment. As illustrated in FIG. 7, when a value of N is 2, the time-domain position of the resource for reporting the CSI measurement information is offset from the time-domain position of the resource for measuring the CSI by 2 slots.

The network side device receives the CSI measurement information based on a second period, which may receive the CSI measurement information reported by the terminal timely.

In an embodiment of the present disclosure, resource positions of the N slots offset may be determined based on preconfiguration information. In some embodiments, the network side device may set N to a fixed value by means of a configured signaling or a communication protocol. In another embodiment, the network side device may dynamically determine an offset value N based on the configured signaling. The network side device determines the value of N based on the preconfiguration information, and receives the CSI measurement information at a position which is offset from the time-domain position of the resource for measuring the CSI by the N slots. In another implementation, the network side device may further determine the value of N by means of the RRC signaling. In this case, the value of N may be variable. The network side device may report the CSI measurement information by selecting one candidate offset slot from a set of offset slots as a slot offset from the time-domain position of the resource for measuring the CSI by the N slots based on a processing capacity of the terminal. The value of N is configured to the terminal by means of the RRC signaling. As described above, the CSI measurement and receiving the CSI measurement information are performed based on different time domain resources of the PUCCH resource.

Receiving the CSI measurement information based on the PUCCH resource further includes an implementation that the network side device requests to acquire a PUCCH resource for reporting the CSI measurement information based on a first uplink scheduling request (SR) SR1 of the terminal. In some embodiments, the network side device may configure the PUCCH resource for reporting the CSI measurement information for the terminal. The SR1 is dedicated for requesting to acquire the PUCCH resource for reporting the CSI measurement information.

The network side device allocates for the terminal the PUCCH resource required for reporting the CSI measurement information when receiving a dedicated SR1 signaling sent by the terminal. Based on the above embodiment, the first configuration parameter for the terminal to report the CSI measurement information is determined by the network side device, therefore, the network side device may determine a size of a payload of the CSI measurement information reported by the terminal. When determining that the payload of the CSI measurement information currently reported by the terminal is small, the network side device may indicate the terminal to report the CSI measurement information by means of PUCCH format 2. When determining that the payload of the CSI measurement information reported by the terminal is large, the network side device may indicate the terminal to report the CSI measurement information by means of a new PUCCH format, and allocate more time-frequency resources for the new PUCCH format. The network side device indicates a position and a format of the PUCCH resource used by the terminal by means of DCI.

An embodiment of the present disclosure provides the method for reporting the CSI. The embodiment may be separately implemented or in combination with any other embodiment. The method for reporting the CSI in an embodiment of the present disclosure includes reporting, by the terminal, the CSI measurement information based on a PUSCH resource.

In an implementation, for a situation that an available PUSCH resource is presented currently in the terminal, the terminal determines to report the CSI measurement information by using the current available PUSCH resource, in response to determining that the available PUSCH resource is presented currently. The network side device may receive the CSI measurement information based on the available PUSCH resource of the terminal. For convenience of description, the available PUSCH resource presented currently is referred to as a first PUSCH resource. The first PUSCH resource is used for transmitting other uplink data simultaneously. In embodiments of the present disclosure, in order to distinguish the CSI measurement information and other uplink data, the CSI measurement information is carried by a MAC-CE of the first PUSCH resource. The MAC-CE uses a reserved value 35 of a logical channel identify (LCID) of an uplink shared channel (UL-SCH). In embodiments of the present disclosure, the MAC CE for CSI measurement information reporting uses a variable byte, and the size of bytes of the MAC-CE for CSI measurement information reporting is determined based on the number of measurement items included in the CSI measurement information reported.

Figure 8:
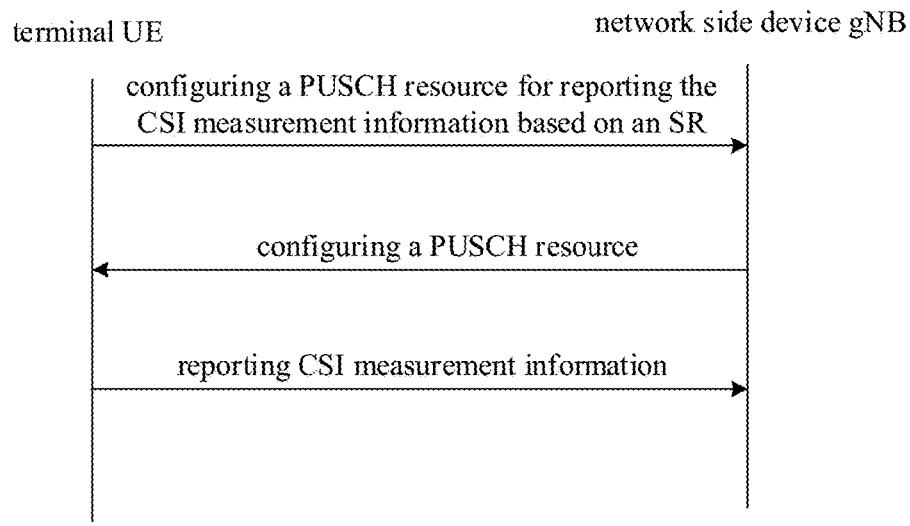
FIG. 8 is a schematic diagram illustrating receiving CSI measurement information by multiplexing a PUSCH resource carrying a buffer status report (BSR) in a method for reporting channel state information (CSI) according to an exemplary embodiment.

In another implementation, the terminal may report the CSI measurement information by multiplexing a PUSCH resource of a buffer status report (BSR), and the network side device may receive the CSI measurement information based on the PUSCH resource of the BSR. For example, the implementation is applicable to a situation that no available PUSCH resource and no other uplink data transmission are presented currently. For convenience of description, the PUSCH resource carrying the BSR is referred to as a second PUSCH resource. In the present disclosure, the CSI measurement information for reporting uses the reserved value 35 of the LCID of the UL-SCH. For example, FIG. 8 is a schematic diagram illustrating receiving CSI measurement information by multiplexing a PUSCH resource carrying a buffer status report (BSR) in a method for reporting channel state information (CSI) according to an exemplary embodiment. As illustrated in FIG. 8, the terminal requests to configure the PUSCH resource for receiving the CSI measurement information to the network side device request based on a general scheduling request (SR). The network side device configures the PUSCH resource after receiving request information sent by the terminal, and the network side device receives the CSI measurement information based on the PUSCH resource configured by the terminal. It may be understood that, since the PUSCH resource for transmitting the BST that is allocated for the terminal by the network side device is small, the implementation is applicable to a situation that a payload for carrying the CSI measurement information is small.

Figure 9:
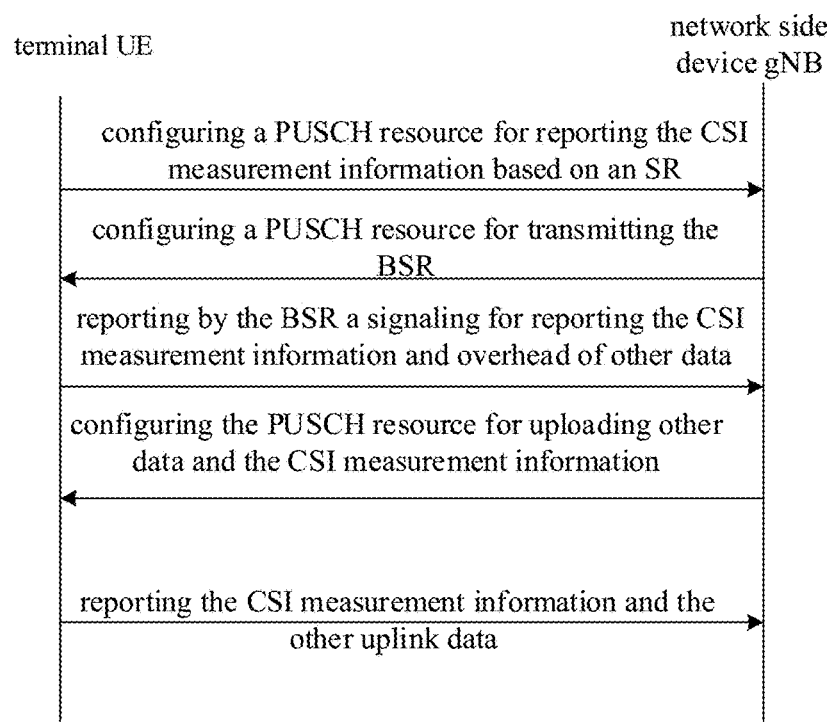
FIG. 9 is a schematic diagram illustrating receiving CSI measurement information by using a resource for transmitting other uplink data in a method for reporting channel state information (CSI) according to an exemplary embodiment.

In another implementation, the network side device may receive, based on the first PUSCH resource for transmitting other uplink data transmission, the CSI measurement information, or the CSI measurement information and other uplink transmission data together. For example, the implementation is applicable to a situation that no available PUSCH resource is presented currently and other uplink data transmission is presented currently. FIG. 9 is a schematic diagram illustrating receiving CSI measurement information by using a resource for transmitting other uplink data in a method for reporting channel state information (CSI) according to an exemplary embodiment. As illustrated in FIG. 9, the terminal requests to use a PUSCH resource for reporting the CSI measurement information based on a general scheduling request (SR). Taking the other uplink data being a BSR for an example, the network side device configures for the terminal the PUSCH resource for transmitting the BSR based on the SR sent by the terminal. The BSR transmitted by the terminal reports a signaling for reporting the CSI measurement information as well as overhead of other data to the network side device. The network side device configures for the terminal the PUSCH resource for uploading the other data and the CSI measurement information based on the signaling of the CSI measurement information and the overhead of the other data. The network side device receives the CSI measurement information and the other uplink data based on the PUSCH resource. In an embodiment of the present disclosure, the reported CSI measurement information is carried by the MAC-CE of the PUSCH resource, and use a reserved value 35 of the LCID of the UL-SCH. The implementation is further applicable to a situation that the payload for carrying the CSI measurement information is large and no other uplink data is to be transmitted.

In an embodiment of the present disclosure, receiving the CSI measurement information based on the PUSCH resource further includes an implementation that the network side device receives a second uplink scheduling request (SR) SR2 sent by the terminal. The SR2 is dedicated for requesting to acquire a third PUSCH resource for reporting CSI measurement information, and the third PUSCH resource is dedicated for transmitting the CSI measurement information. In the implementation, the terminal sends the SR2 request to request the third PUSCH resource for reporting the CSI measurement information, and the network side allocates for the terminal the third PUSCH resource for reporting the CSI measurement information based on the scheduling request SR2 dedicated for the terminal. A size of the third PUSCH resource is determined based on the first configuration parameter configured by the network side device for the terminal.

In embodiments of the present disclosure, various implementations for reporting the CSI measurement information configured increases flexibility of reporting the CSI measurement information. And, the dedicated SR1 and SR2 involved in the disclosure are redesigned, and the general SR may be differentiated with the dedicated SR1 and SR2 based on different time-frequency domain resource positions/sequences. It may be understood that the redesigned dedicated SR1 and SR2 may not affect other uplink scheduling request.

An embodiment of the present disclosure provides the method for reporting the CSI. The embodiment may be separately implemented or in combination with any other embodiment. The method for reporting the CSI in an embodiment of the present disclosure includes that the terminal reports the CSI measurement information by combining the PUCCH resource with the PUSCH resource.

In some embodiments, when the available PUCCH resource is presented, the CSI measurement information is reported by means of the PUCCH resource. When no available PUCCH resource is presented, the CSI measurement information is reported by means of the PUSCH resource. However, how to report by means of the PUCCH resource may refer to any one way in embodiments of the present disclosure, and adopt any one feasible way in the related art. Similarly, how to report by means of the PUSCH resource may refer to any one way in embodiments of the present disclosure, and adopt any one feasible way in the related art.

In some embodiments, when the available PUCCH resource is presented, the CSI measurement information may be reported by means of the PUCCH resource. when no available PUCCH resource is presented, the CSI measurement information may be reported by means of the PUSCH resource. However, how to report by means of the PUCCH resource may refer to any one way in embodiments of the present disclosure, and adopt any one feasible way in the related art. Similarly, how to report by means of the PUSCH resource may refer to any one way in embodiments of the present disclosure, and adopt any one feasible way in the related art.

Based on the same concept, an apparatus for reporting channel state information (CSI) is further provided in embodiments of the present disclosure.

It may be understood that, the apparatus for reporting CIS provided in embodiments of the present disclosure includes hardware structures and/or software modules that perform corresponding functions in order to achieve the above functions. In combination with modules and algorithm steps of examples described in embodiments of the present disclosure, the embodiments of the present disclosure may be implemented in the form of a hardware or a combination of a hardware and a computer software. Whether a certain function is executed by a hardware or a computer software driving a hardware depends on specific applications and design constraints of the technical solution. Those skilled in the art may adopt different methods for each specific application to implement the described functions, but such implementation should not be considered as beyond the scope of the technical solutions in embodiments of the present disclosure.

Figure 10:
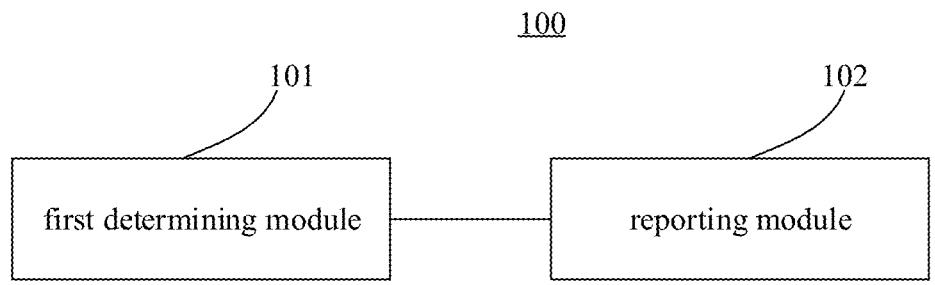
FIG. 10 is a block diagram illustrating an apparatus for reporting channel state information (CSI) according to an exemplary embodiment.

FIG. 10 is a block diagram illustrating an apparatus 100 for reporting channel state information (CSI) according to an exemplary embodiment. As illustrated in FIG. 10, the apparatus includes a first determining module 101 and a reporting module 102.

The first determining module 101 is configured to determine a configuration parameter. The first configuration parameter is used to indicate a parameter for a first type of terminal to report CSI measurement information, and the first configuration parameter at least includes a CSI measurement information reporting threshold value. The reporting module 102 is configured to report the CSI measurement information based on the CSI measurement information reporting threshold value.

In embodiments of the present disclosure, the reporting module 102 is configured to report the CSI measurement information in response to a difference value between a first CSI measurement value and a second CSI measurement value of a channel state being greater than the CSI measurement information reporting threshold value;

or report the CSI measurement information in response to the difference value between the first CSI measurement value and the second CSI measurement value of the channel state being equal to the CSI measurement information reporting threshold value.

In embodiments of the present disclosure, the reporting module 102 is configured to not report the CSI measurement information in response to a difference value between a first CSI measurement value and a second CSI measurement value of a channel state being less than the CSI measurement information reporting threshold value;

or not report the CSI measurement information in response to the difference value between the first CSI measurement value and the second CSI measurement value of the channel state being equal to the CSI measurement information reporting threshold value.

In embodiments of the present disclosure, the CSI measurement information reporting threshold value is determined based on a terminal type and/or a service type.

In embodiments of the present disclosure, the reporting module 102 is configured to report the CSI measurement information based on the physical uplink control channel (PUCCH) resource.

In embodiments of the present disclosure, the reporting module 102 is configured to periodically report the CSI measurement information on the PUCCH resource based on a second period in response to periodically measuring CSI based on a first period, in which, the second period has a same initial time-domain position and slot length as the first period, and a time-domain position of the PUCCH resource in the second period is offset from a time-domain position of the PUCCH resource in the first period by N slots, the time-domain position of the PUCCH resource in the second period is used as a time-domain position of a resource for transmitting current CSI measurement information; in which, the first period is determined based on a channel quality status.

In embodiments of the present disclosure, the reporting module 102 is configured to report the CSI measurement information based on a first PUCCH resource in response to non-periodically measuring CSI, in which a time-domain position of the first PUCCH resource is offset from a time-domain position of a resource for measuring the CSI by N slots, the time-domain position of the first PUCCH resource is as a time-domain position of a resource for transmitting current CSI measurement information.

In embodiments of the present disclosure, resource positions of the N slots are determined based on preconfiguration information;

or determined based on a radio resource control (RRC) signaling.

In embodiments of the present disclosure, the frequency domain position of the PUCCH resource is determined via an RRC signaling.

In embodiments of the present disclosure, the reporting module 102 is further configured to send a first uplink scheduling request (SR) SR1. The SR1 is dedicated for requesting to acquire a PUCCH resource for reporting CSI measurement information.

In embodiments of the present disclosure, the reporting module 102 is configured to report the CSI measurement information based on a physical uplink shared channel (PUSCH).

In embodiments of the present disclosure, the reporting module 102 is configured to, report the CSI measurement information based on the first PUSCH resource, in response to an available first PUSCH resource being presented currently, in which, the first PUSCH resource is used for transmitting other uplink data.

In embodiments of the present disclosure, the CSI measurement information is carried by a media access control, control element (MAC-CE) of the first PUSCH resource.

In embodiments of the present disclosure, the reporting module 102 is configured to, report the CSI measurement information by multiplexing a second PUSCH resource carrying a buffer status report (BSR), in response to no available PUSCH resource and no other uplink data transmission being presented currently.

In embodiments of the present disclosure, the CSI measurement information is carried by a MAC-CE of the second PUSCH resource.

In embodiments of the present disclosure, the reporting module 102 is configured to, determine to report the CSI measurement information by using a first PUSCH resource, in response to no available PUSCH resource being presented currently and other uplink data transmission being presented, in which, the first PUSCH resource is used for transmitting other uplink data.

In embodiments of the present disclosure, the reporting module 102 is configured to send a second uplink scheduling request (SR) SR2. The SR2 is dedicated for requesting to acquire a third PUSCH resource for reporting the CSI measurement information, and the third PUSCH resource is dedicated for transmitting the CSI measurement information.

Figure 11:
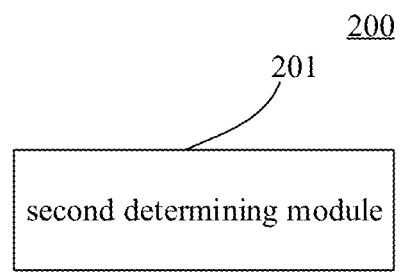
FIG. 11 is a block diagram illustrating another apparatus for reporting channel state information (CSI) according to an exemplary embodiment.

FIG. 11 is a block diagram illustrating an apparatus 200 for reporting channel state information (CSI) according to an exemplary embodiment. The apparatus 200 is performed by a network-side device. As illustrated in FIG. 11, the apparatus includes a second determining module 201.

The second determining module 201 is configured to determine a configuration parameter. The first configuration parameter is used to indicate a parameter for a first type of terminal to report CSI measurement information, and the first configuration parameter at least includes a CSI measurement information reporting threshold value.

Figure 12:
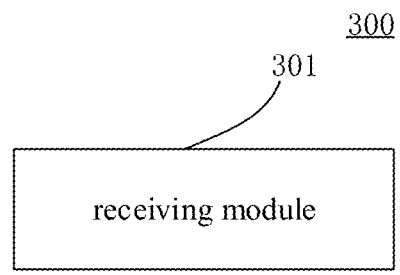
FIG. 12 is a block diagram illustrating yet another apparatus for reporting channel state information (CSI) according to an exemplary embodiment.

In embodiments of the present disclosure, FIG. 12 is a block diagram illustrating an apparatus 300 for reporting channel state information (CSI) according to an exemplary embodiment. The apparatus for reporting channel state information (CSI) includes a receiving module 301.

The receiving module 301 is configured to receive CSI measurement information. The CSI measurement information is CSI measurement information reported by first type of terminal in response to a difference value between a first CSI measurement value and a second CSI measurement value of a channel state being greater than the CSI measurement information reporting threshold value.

Alternatively, the CSI measurement information is CSI measurement information reported by the first type of terminal in response to the difference value between the first CSI measurement value and the second CSI measurement value of the channel state being equal to the CSI measurement information reporting threshold value.

In embodiments of the present disclosure, the CSI measurement information reporting threshold value is determined based on a terminal type and/or a service type.

In embodiments of the present disclosure, the receiving module 301 is configured to receive the CSI measurement information based on the physical uplink control channel (PUCCH) resource.

In embodiments of the present disclosure, the receiving module 301 is configured to periodically receive the CSI measurement information on the PUCCH resource based on a second period in response to periodically measuring CSI based on a first period, in which the second period has a same initial time-domain position and slot length as the first period, and a time-domain position of the PUCCH resource in the second period is offset from a time-domain position of the PUCCH resource in the first period by N slots, the time-domain position of the PUCCH resource in the second period is used as a time-domain position of a resource for transmitting current CSI measurement information; in which the first period is determined based on a channel quality status.

In embodiments of the present disclosure, the receiving module 301 is configured to receive the CSI measurement information based on a first PUCCH resource in response to non-periodically measuring CSI, in which a time-domain position of the first PUCCH resource is offset from a time-domain position of a resource for measuring the CSI by N slots, the time-domain position of the first PUCCH resource is as a time-domain position of a resource for transmitting current CSI measurement information.

In embodiments of the present disclosure, resource positions of the N slots are determined based on preconfiguration information;

or, determined based on a radio resource control (RRC) signaling.

In embodiments of the present disclosure, the frequency domain position of the PUCCH resource is determined via a RRC signaling.

In embodiments of the present disclosure, the receiving module 301 is further configured to receive a first uplink scheduling request (SR) SR1. The SR1 is dedicated for requesting to acquire a PUCCH resource for reporting CSI measurement information.

In embodiments of the present disclosure, the receiving module 301 is configured to receive the CSI measurement information based on the physical uplink shared channel (PUSCH).

In embodiments of the present disclosure, the receiving module 301 is configured to, receive the CSI measurement information based on the first PUSCH resource, in response to an available first PUSCH resource being presented currently. The first PUSCH resource is used for transmitting other uplink data.

In embodiments of the present disclosure, the CSI measurement information is carried by a media access control, control element (MAC-CE) of the first PUSCH resource.

In embodiments of receiving present disclosure, the receiving module 301 is configured to, receive the CSI measurement information by multiplexing a second PUSCH resource carrying a buffer status report (BSR), in response to no available PUSCH resource and no other uplink data transmission being presented currently.

In embodiments of the present disclosure, the CSI measurement information is carried by a MAC-CE of the second PUSCH resource.

In embodiments of the present disclosure, the receiving module 301 is configured to, determine to receive the CSI measurement information by using the first PUSCH resource, in response to no available PUSCH resource being presented currently and other uplink data transmission being presented, in which, the first PUSCH resource is used for transmitting other uplink data.

In embodiments of the present disclosure, the receiving module 301 is configured to receive a second uplink scheduling request (SR) SR2. The SR2 is dedicated for requesting to acquire a third PUSCH resource for reporting the CSI measurement information, and the third PUSCH resource is dedicated for transmitting the CSI measurement information.

With regard to the apparatus in the above embodiments, the specific way in which each module performs the operation has been described in detail in the embodiments of the method and will not be elaborated here.

Figure 13:
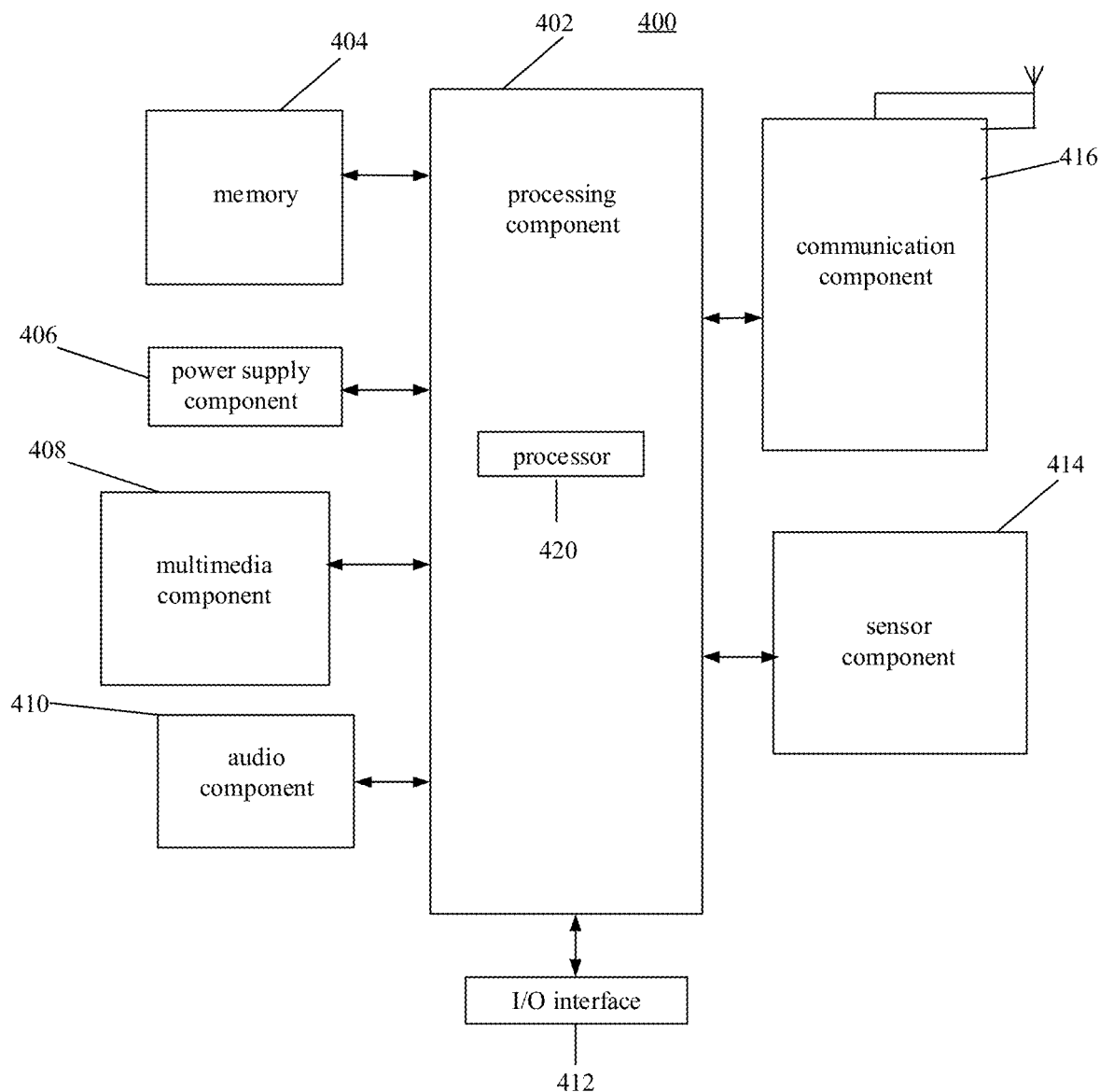
FIG. 13 is a block diagram illustrating a device according to an exemplary embodiment.

FIG. 13 is a block diagram illustrating a device 400 for reporting channel state information (CSI) according to an exemplary embodiment. For example, the device 400 may be a mobile phone, a computer, a digital broadcasting terminal, a messaging device, a game console, a tablet device, a medical equipment, a fitness equipment, a personal digital assistant, etc.

As illustrated in FIG. 13, the device 400 may include one or more components: a processing component 402, a memory 404, a power supply component 406, a multimedia component 408, an audio component 410, an input/output (I/O) interface 412, a sensor component 414, and a communication component 416.

The processing component 402 generally controls the whole operation of the device 400, such as operations related to display, phone call, data communication, camera operation and recording operation. The processing component 402 may include one or more processors 420 to perform instructions, to complete all or part of blocks of the above method. In addition, the processing component 402 may include one or more modules for the convenience of interaction between the processing component 402 and other components. For example, the processing component 402 may include a multimedia module for the convenience of interaction between the multimedia component 408 and the processing component 402.

The memory 404 is configured to store all types of data to support the operation of the device 400. Examples of the data include the instructions of any applications or methods operated on the device 400, contact data, phone book data, messages, pictures, videos, etc. The memory 404 may be implemented by any type of volatile or non-volatile storage devices or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply component 406 may provide power supply for all components of the device 400. The power supply component 406 may include a power supply management system, one or more power supplies, and other units related to generating, managing and distributing power for the device 400.

The multimedia component 408 includes an output interface screen provided between the device 400 and the user. In some embodiments, a screen may include a liquid crystal display (LCD) and a touch panel (TP). When the screen includes a touch panel, the screen may be implemented as a touch screen to receive input signals from the user. The touch panel includes one or more touch sensors to sense touch, slide and gestures on the touch panel. The touch sensor may not only sense the boundary of touch or slide action, but also detect the duration and pressure related to the touch or slide operation. In some embodiments, the multimedia component 408 includes a front camera and/or a rear camera. When the device 400 is in an operation mode, such as a shooting mode or a video mode, the front camera or the rear camera may receive external multimedia data.

Each front camera and rear camera may be a fixed optical lens system or an optical lens system with a focal length and an optical zoom capacity.

The audio component 410 is configured as an output and/or input signal. For example, the audio component 410 includes a microphone (MIC). When the device 400 is in operation mode, such as call mode, record mode, and speech recognition mode, the microphone is configured to receive the external audio signals. The audio signals received may be further stored in the memory 404 or sent via the communication component 416. In some embodiments, the audio component 410 further includes a speaker configured to output an audio signal.

The I/O interface 412 provides an interface for the processing component 402 and the peripheral interface module, and the peripheral interface module may be a keyboard, a click wheel, a button, etc. The buttons may include but not limited to a home button, a volume button, a start button and a lock button.

The sensor component 414 includes one or more sensors, configured to provide various aspects of status assessment for the device 400. For example, the sensor component 414 may detect the on/off state of the device 400 and the relative positioning of the component. For example, the component is a display and a keypad of the device 400. The sensor component 414 may further detect the location change of the device 400 or one component of the device 400, the presence or absence of contact between the user and the device 400, the orientation or acceleration/deceleration of the device 400, and the temperature change of the device 400. The sensor component 414 may include a proximity sensor, which is configured to detect the existence of the objects nearby without any physical contact. The sensor component 414 may further include a light sensor such as CMOS or CCD image sensor, which is configured to use in imaging applications. In some embodiments, the sensor component 414 may further include an acceleration transducer, a gyroscope sensor, a magnetic sensor, a pressure sensor or a temperature sensor.

The communication component 416 is configured for the convenience of wire or wireless communication between the device 400 and other devices. The device 400 may access wireless networks based on communication standard, such as Wi-Fi, 2G or 3G, or their combination. In an exemplary embodiment, the communication component 416 receives broadcast signals or broadcast-related information from an external broadcast management system via a broadcast channel. In an exemplary embodiment, the communication component 416 further includes a near field communication (NFC) module to facilitate short-range communication. For example, an NFC module may be implemented based on a radio frequency identification (RFID) technology, an infrared data association (IRDA) technology, an ultra-wideband (UWB) technology, bluetooth (BT) technology and other technologies.

In an exemplary embodiment, the device 400 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components, which is configured to perform the above method.

In an exemplary embodiment, a non-transitory computer readable storage medium is further provided which includes instructions, such as the memory 404 including instructions. The instructions may be executed by the processor 420 of the device 400 to complete the above methods. For example, the non-transitory computer-readable storage medium may be a ROM, a random access memory (RAM), a CD-ROM, a magnetic tape, a floppy disk, an optical data storage device, etc.

Figure 14:
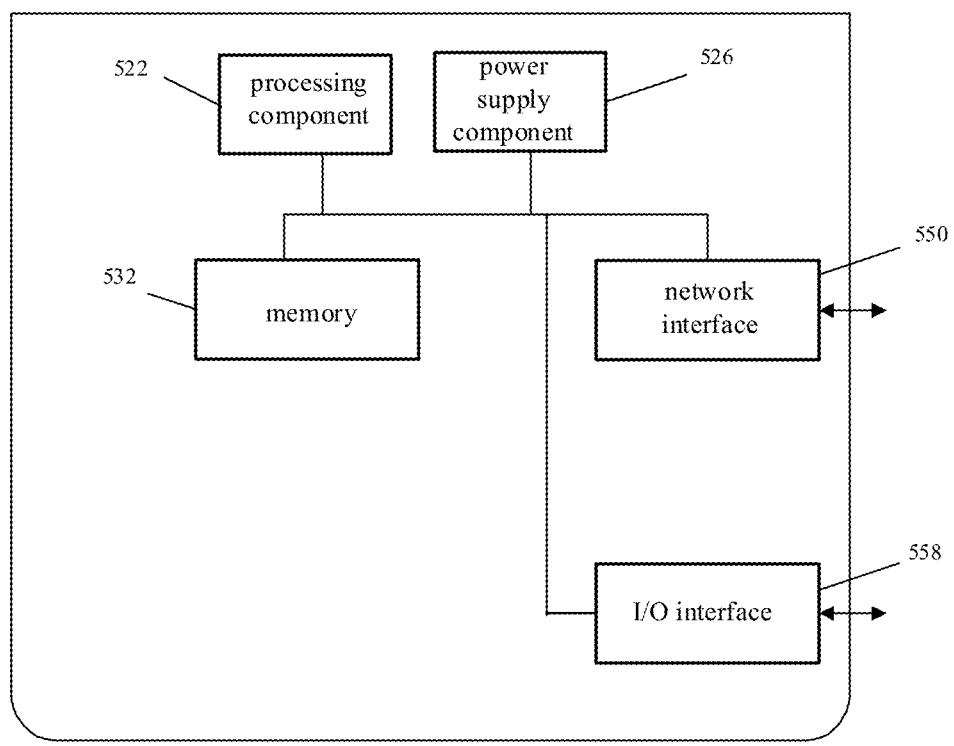
FIG. 14 is a block diagram illustrating a device according to an exemplary embodiment.

FIG. 14 is a block diagram illustrating a device 500 for reporting channel state information (CSI) according to an exemplary embodiment. For example, the device 500 may be provided as a server. As illustrated in FIG. 14, the device 500 includes a processing component 522, which further includes one or more processors, and memory resources represented by a memory 532, which are configured to store instructions executed by the processing component 522, for example, an application. The application stored in the memory 532 may include one or more modules each of which corresponds to a set of instructions. In addition, the processing component 522 is configured to execute instructions, to perform the method for reporting channel state information (CSI).

The device 500 may further include one power supply component 526 configured to execute power management of the device 500, and one wired or wireless network interface 550 configured to connect the device 500 to a network, and one input/output (I/O) interface 558. The device 500 may operate an operating system stored in the memory 532, for example, Windows Server™, Mac OS X™, Unix™, Linux™, FreeBSD™.

It may be further understood that, "more than one" in the present disclosure means two or above, which is similar to other quantifiers. "and/or", describes the relationship of the association objects, indicating that there may exist three relationships, for example, A and/or B, may represent: any of existing A only, existing both A and B, or existing B only. The character "/" generally means the contextual object is a kind of "or" relationship. The singular forms "a", "the" and "said are also intended to include plural forms, unless the context clearly indicates otherwise.

It should be further understood that, although the terms "first", "second", "third", etc. may be configured to describe various information, such information shall not be limited to these terms. These terms are only used to distinguish the same type of information, rather than indicate a particular order or importance degree. In fact, "first", "second" and other similar descriptions may be used interchangeably. For example, subject to the scope of this present disclosure, first information may also be referred to as second information, and similarly, and second information may also be referred to as first information.

It may be further understood that, even though operations are described in the drawings in a particular order, it should not be understood as requiring that such operations be performed in the particular order shown or in sequential order, or that all illustrated operations be performed to obtain desirable results. In certain circumstances, multitasking and parallel processing may be advantageous.

After considering the specification and practicing the disclosure here, those skilled in the art will easily think of other implementations. The present application is intended to cover any variations, usages, or adaptive changes of the present disclosure. These variations, usages, or adaptive changes follow the general principles of the present disclosure and include common knowledge or conventional technical means in the technical field not disclosed by the present disclosure. The description and the embodiments are to be regarded as exemplary only, and the true scope and spirit of the present disclosure are given by the appended claims.

It should be understood that the present disclosure is not limited to the precise structure described above and shown in the drawings, and various modifications and changes may be made without departing from its scope. The scope of the present application is only limited by the appended claims. The scope of the present application is only limited by the appended claims.

What is claimed is:

1. A method for reporting channel state information (CSI), performed by a terminal, comprising:
   determining a first configuration parameter, wherein the first configuration parameter indicates a parameter for a first type of terminal to report measurement information for CSI, the first type of terminal is a redcap UE, and the first configuration parameter at least comprises a threshold value;
   determining a difference value between a first measurement value for CSI and a second measurement value for CSI; and
   reporting the measurement information based on the threshold value and the difference value, wherein the threshold value is determined based on one or more of a terminal type and a service type.

2. The method of claim 1, wherein reporting the measurement information based on the threshold value and the difference value comprises:
   determining that a difference value between a first CSI measurement value and a second CSI measurement value of a channel state is greater than the threshold value, and reporting the measurement information;
   or
   determining that the difference value between the first CSI measurement value and the second CSI measurement value of the channel state is equal to the threshold value, and reporting the measurement information.

3. The method of claim 1, wherein reporting the measurement information comprises:
   periodically measuring CSI based on a first period; and
   periodically reporting the measurement information on a physical uplink control channel (PUCCH) resource based on a second period, wherein the second period has a same initial time-domain position and slot length as the first period, and a time-domain position of the PUCCH resource in the second period is offset from a time-domain position of the PUCCH resource in the first period by N slots, the time-domain position of the PUCCH resource in the second period is used as a time-domain position of a resource for transmitting measurement information;
   wherein the first period is determined based on a channel quality status.

4. The method of claim 3, wherein positions of the N slots are determined based on preconfiguration information;
   or
   determined based on a radio resource control (RRC) signaling.

5. The method of claim 1, further comprising:
   sending a first uplink scheduling request (SR), wherein the first uplink SR is dedicated for requesting to acquire a PUCCH resource for reporting the measurement information.

6. The method of claim 1, wherein reporting the measurement information comprises:
   determining that a first physical uplink shared channel (PUSCH) resource available for CSI is presented; reporting the measurement information based on the first PUSCH resource, wherein the first PUSCH resource is used for transmitting other uplink data; or
   determining that no PUSCH resource available for the CSI and no other uplink data transmission are presented; reporting the measurement information by multiplexing a second physical uplink shared channel (PUSCH) resource carrying a buffer status report (BSR); or
   determining that no PUSCH resource available for the CSI is presented and other uplink data transmission is presented; determining to reporting the measurement information by using the first physical uplink shared channel (PUSCH) resource, wherein the first PUSCH resource is used for transmitting other uplink data.

7. The method of claim 6, wherein the measurement information is carried by a media access control, control element (MAC CE) of the first PUSCH resource when the first PUSCH resource available for the CSI is presented;
   or
   the measurement information is carried by a MAC-CE of the second PUSCH resource when no PUSCH resource available for the CSI and no other uplink data transmission are presented.

8. The method of claim 1, wherein reporting the measurement information comprises:
   sending a second uplink scheduling request (SR), wherein the second uplink SR is dedicated for requesting to acquire a third PUSCH resource for reporting the measurement information, and the third PUSCH resource is dedicated for transmitting the measurement information.

9. A non-transitory computer-readable storage medium, wherein, when instructions in the storage medium are executed by a processor of a mobile terminal, the mobile terminal is caused to perform the method of claim 1.

10. The method of claim 1, wherein reporting the measurement information comprises:
    determining that no PUCCH resource available for CSI is presented;
    reporting the measurement information based on a physical uplink shared channel (PUSCH) resource.

11. A method for reporting channel state information (CSI), performed by a network-side device, comprising:
    determining a first configuration parameter, wherein the first configuration parameter indicates a parameter for a first type of terminal to report measurement information for CSI, the first type of terminal is a redcap UE, and the first configuration parameter at least comprises a threshold value; and
    receiving the measurement information reported by a terminal;
    wherein the measurement information is determined based on the threshold value and a difference value, the difference value being a difference value between a difference value between a first measurement value for CSI and a second measurement value for CSI, wherein the threshold value is determined based on one or more of a terminal type and a service type.

12. The method of claim 11, comprising:
    determining a difference value between a first CSI measurement value and a second CSI measurement value of a channel state is greater than the threshold value, and receiving the measurement information, wherein the measurement information is measurement information reported by the first type of terminal;
    or determining that difference value between the first CSI measurement value and the second CSI measurement value of the channel state is equal to the threshold value, and receiving the CSI measurement information, wherein the measurement information is measurement information reported by the first type of terminal.

13. The method of claim 12, wherein receiving the measurement information comprises:
periodically measuring CSI based on a first period; and
periodically receiving the measurement information on a physical uplink control channel (PUCCH) resource based on a second period, wherein the second period has a same initial time-domain position and slot length as the first period, and a time-domain position of the PUCCH resource in the second period is offset from a time-domain position of the PUCCH resource in the first period by N slots, the time-domain position of the PUCCH resource in the second period is used as a time-domain position of a resource for transmitting measurement information;
wherein the first period is determined based on a channel quality status.

14. The method of claim 13, wherein, positions of the N slots are determined based on preconfiguration information; or
determined based on a radio resource control (RRC) signaling.

15. The method of claim 12, further comprising:
receiving a first uplink scheduling request (SR), wherein the first uplink SR is dedicated for requesting to acquire a PUCCH resource for reporting the measurement information.

16. The method of claim 12, wherein receiving the measurement information comprises:
determining that a first physical uplink shared channel (PUSCH) resource available for CSI is presented; receiving the measurement information based on the first PUSCH resource, wherein the first PUSCH resource is used for transmitting other uplink data; or
determining that no PUSCH resource available for the CSI and no other uplink data transmission are presented; receiving the measurement information by multiplexing a second physical uplink shared channel (PUSCH) resource carrying a buffer status report (BSR); or
determining no PUSCH resource available for the CSI being presented and other uplink data transmission being presented, and receiving the measurement information by using the first physical uplink shared channel (PUSCH) resource, wherein the first PUSCH resource is used for transmitting other uplink data.

17. The method of claim 16, wherein, the measurement information is carried by a media access control, control element (MAC-CE) of the first PUSCH resource when the first PUSCH resource available for the CSI is presented; or
the measurement information is carried by a MAC-CE of the second PUSCH resource when no PUSCH resource available for the CSI and no other uplink data transmission are presented.

18. The method of claim 12, wherein receiving the measurement information comprises:
receiving a second uplink scheduling request (SR), wherein, the second uplink SR is dedicated for requesting to acquire a third PUSCH resource for reporting the measurement information, and the third PUSCH resource is dedicated for transmitting the measurement information.

19. A non-transitory computer-readable storage medium, wherein, when instructions in the storage medium are executed by a processor of a network-side device, the network-side device is caused to perform the method of claim 11.

20. A communication device, comprising:
a processor; and
a memory configured to store instructions executable by the processor;
wherein, the processor is configured to perform:
determining a first configuration parameter, wherein the first configuration parameter indicates a parameter for a first type of terminal to report measurement information for CSI, the first type of terminal is a redcap UE, and the first configuration parameter at least comprises a threshold value;
determining a difference value between a first measurement value for CSI and a second measurement value for CSI; and
reporting the measurement information based on the threshold value and the difference value, wherein the threshold value is determined based on one or more of a terminal type and a service type.

* * * * *